Oct. 17, 1967  H. W. SIRK  3,347,589
CAMPER
Filed Dec. 9, 1964  3 Sheets-Sheet 1
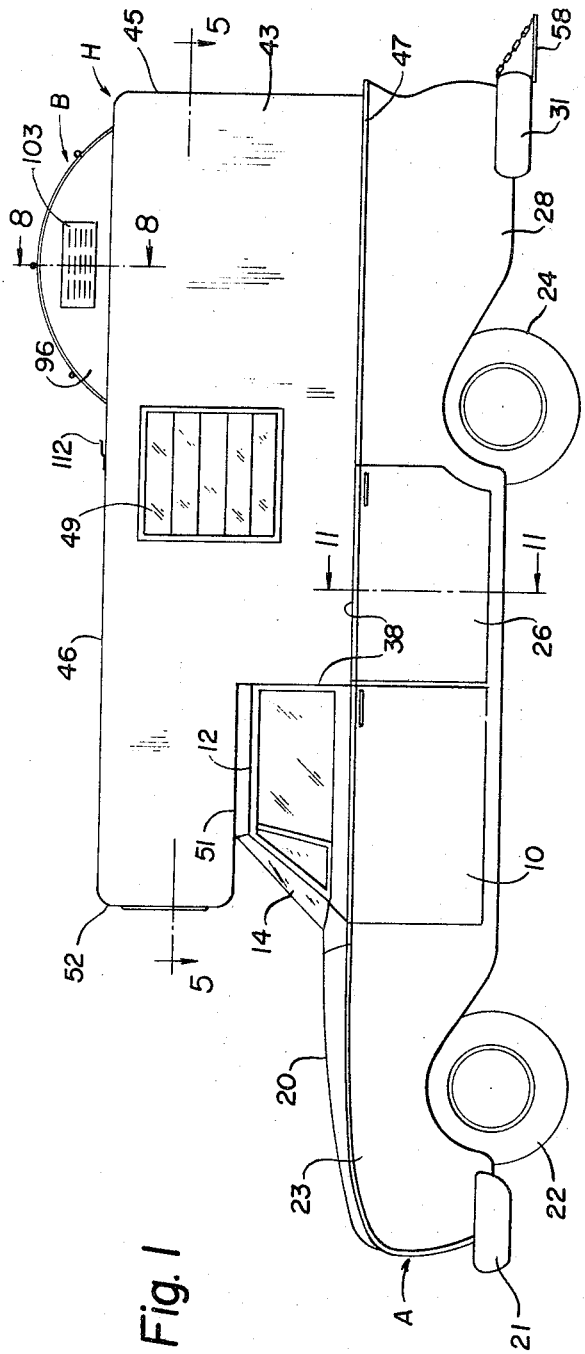
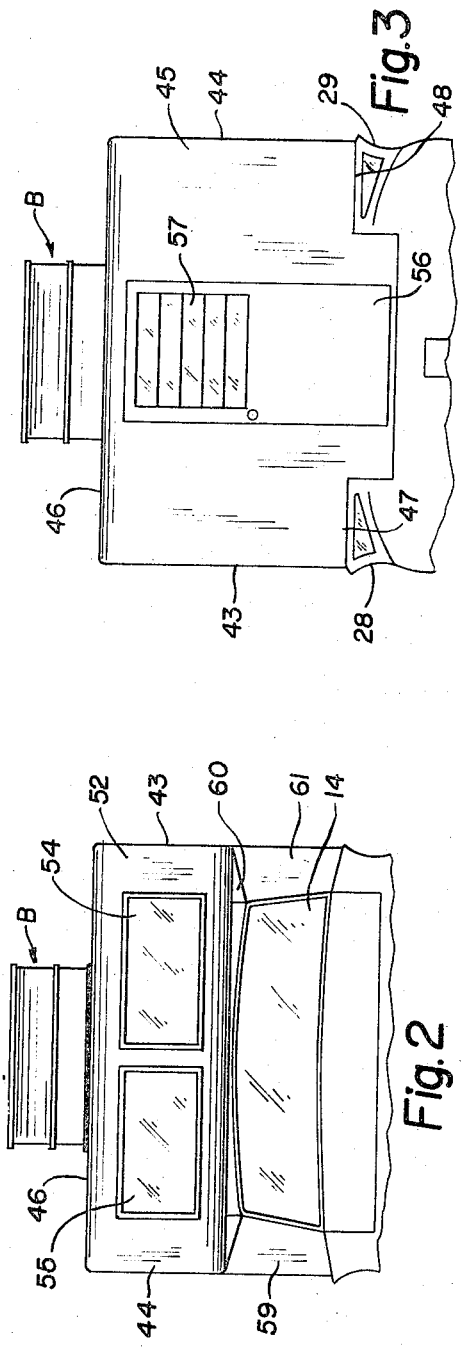
INVENTOR.
HAROLD W. SIRK
BY
*Watts & Fisher*
ATTORNEYS.

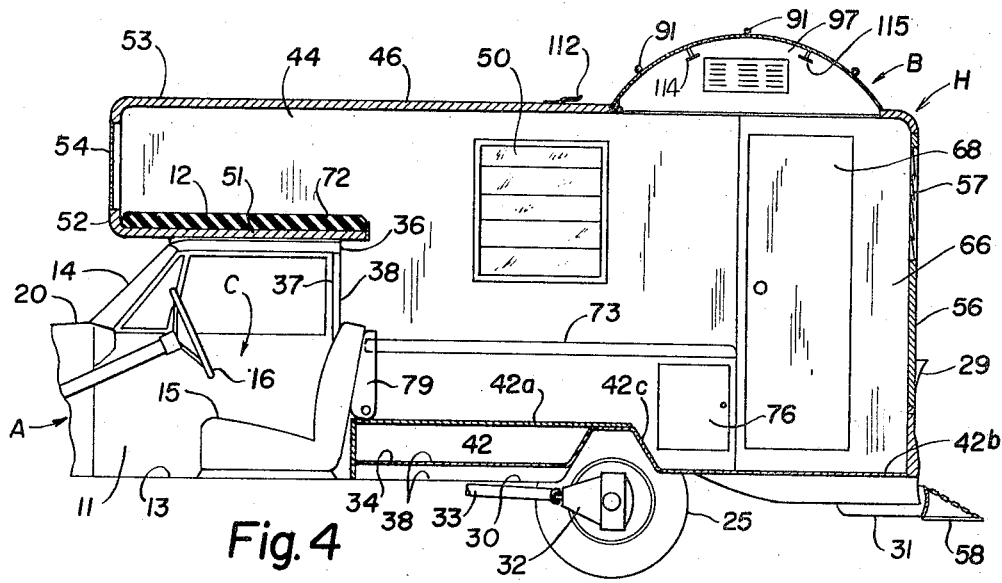

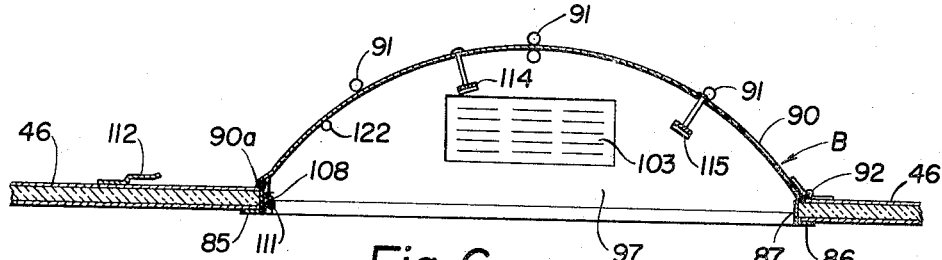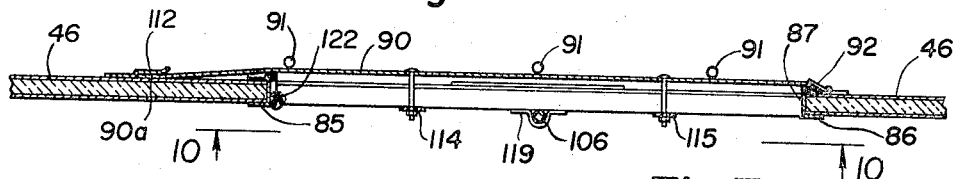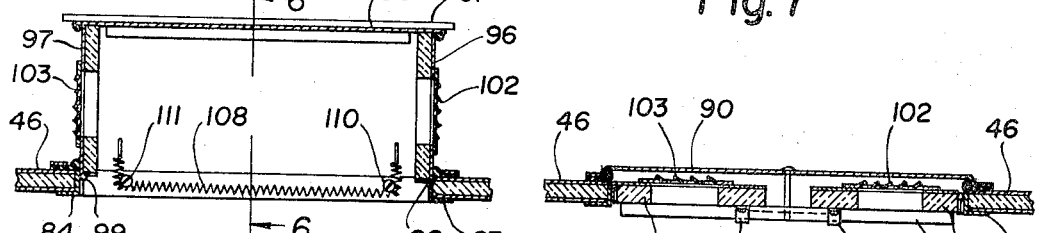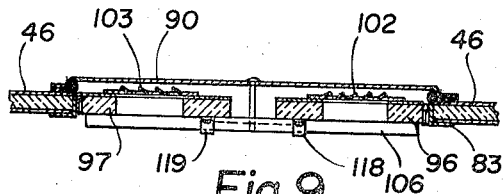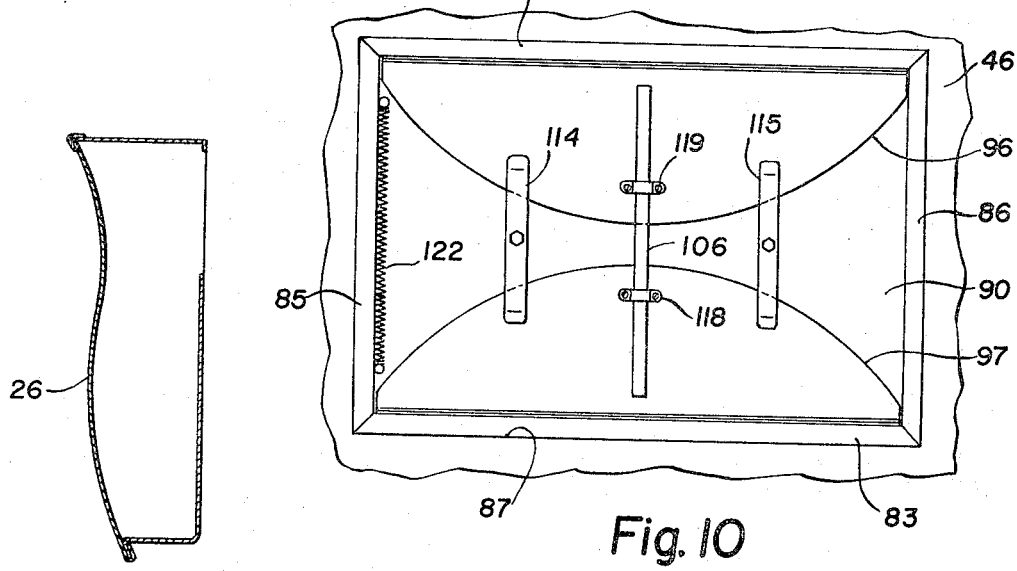

United States Patent Office 3,347,589
Patented Oct. 17, 1967

3,347,589
CAMPER
Harold W. Sirk, 24331 Glenbrook Blvd.,
Cleveland, Ohio 44117
Filed Dec. 9, 1964, Ser. No. 417,043
8 Claims. (Cl. 296—23)

This invention relates to multi-functional motor vehicles and more particularly to a mobile home adapted for placement on a modified, conventional, closed passenger sedan-type automobile.

Heretofore, it has been customary to build or fit out an automotive vehicle, such as passenger automobiles or pickup trucks, with permanent sleeping and living quarters in the form of a separable housing unit mounted on the car or truck, or to provide for such accommodations in a separable trailer.

Such prior structures are objectionable for a number of reasons. Present separable housing units for cars or pickup trucks are far too expensive, lack sufficient storage space, and because of their bulky design, limit the speed of the car or truck and cause steering difficulties—particularly in moderate or high winds. Separable trailers are highly expensive, require separate license plates, and require special parking areas. Additionally, trailers limit the speed of the car, are most difficult to tow and park, and, because of state laws, cannot be occupied when towed.

Accordingly, it is an object of the present invention to provide a passenger car mobile home unit (attachable directly to the car) that is far less expensive than any unit heretofore available and which contains spacious living, sleeping, and eating quarters for six people, including a stove, refrigerator, toilet, etc.

A further object of the invention is to provide a lightweight passenger car mobile home unit directly attachable to the car and having far more storage space than prior structures, yet containing adequate head space, aisle space, and service space for washing, cooking, dressing, eating, etc.

A further object of the invention is to provide a passenger car mobile home unit of the above type that is simple to park, that may be driven at any desired speed, and which is very easy to steer—particularly in high winds.

A further object of the invention is to provide a passenger car mobile home unit of the above type that is simple in construction, inexpensive to manufacture, and highly effective in operation.

Briefly, the foregoing objects are accomplished by the provision of a non-collapsible passenger car mobile home unit positioned in the recess formed by removing the rear half portion of the body (and removing the rear seat) of a standard conventional passenger type automobile to form a unitary structure therewith, whereby the weight of the mobile home unit is carried entirely by the automobile. More specifically, the invention contemplates the use of a standard, mass-produced conventional two-seat six-passenger (two-door or four-door) passenger car and removing therefrom the rear seat, all rear windows (and rear window posts) and the rear portion of the car roof and body starting at a point immediately to the rear of the front seat and extending rearwardly to and including the trunk lid. In a preferred form of the invention, the lower half portion of the two rear doors (if a four-door model is used) and the rear fenders are not removed. In the recess thus formed in the car, a mobile housing unit or cabin is positioned, said housing unit containing all the usual sleeping and living accommodations including beds, dining space, stove, refrigerator, toilet, storage cabinets, etc. With this construction, the entire rear portion of the car, including the rear seat section and the entire trunk area, are utilized to receive and become a part of the cabin. A collapsible bubble-type roof may be furnished on the housing unit thereby providing adequate head space to walk upright therein. An entrance and exit doorway may be provided at the rear of the cabin.

There are many novel advantages to the present construction. For example, the overall cost of the car and housing unit combination is far less than any comparable structure currently available. Specifically, the use of a three or four year old passenger car is preferred—the book value of such car averaging about five hundred dollars. The retail cost of the mobile housing unit of the invention is, at the most, about a thousand dollars. Thus, the invention provides a complete mobile home, including the car and complete sleeping and living quarters, for only fifteen hundred dollars. Since the housing unit is fixedly mounted on the main section of the car, the entire car and housing unit assembly occupies a minimum space when parked and on the road, backing and maneuvering in any direction is facilitated, the engine has less weight to transport and, therefore, is more economical in fuel and oil consumption, and parking and driving in congested traffic conditions are materially simplified. Additionally, the present structure provides far more storage space since considerable additional space interiorly of the two rear car doors (which remain on the car) is available. Access from the housing unit to the front seat of the car is provided such that a common interior is effected therebetween. Also, because of the low-slung structure of the housing unit and the low positioning of the unit in the car, wind resistance of the assembly is kept at a minimum, thereby effecting unusual ease of driving in in view of the load carried by the car. Thus, the invention in no way limits the speed of the car or ease of driving and parking. The increased weight of the car is so distributed that strains and distortions on the car body, chassis and running gear are kept at a minimum.

The use of a standard, conventional mass-produced passenger-type automobile is contemplated. Although there is some variance in the car bodies of the different makes of passenger automobiles, such variances can be accommodated by supplying adapter kits with the mobile cabin to permit the cabin to fit the particular body used with a snug, weather-tight fit. Such kits would include adapter panels and fittings to be inserted at selected joints and areas between the cabin and the car to effect a tight, secure fit.

Other objects and advantages of the invention will be apparent from the following description taken in conjunction with the drawings wherein:

FIG. 1 is a side elevational view of a passenger car mobile home unit constructed in accordance with the invention;

FIG. 2 is a broken front view of the upper portion of the unit shown in FIG. 1;

FIG. 3 is a broken rear view of the upper portion of the unit shown in FIG. 1;

FIG. 4 is a broken side elevational sectional view of the unit shown in FIG. 1, and showing the interior thereof;

FIG. 5 is a broken sectional view taken along the line 5—5 of FIG. 1;

FIG. 6 is an enlarged elevational sectional view of the roof bubble of the unit shown in FIG. 1, and taken along the line 6—6 of FIG. 8;

FIG. 7 is a view similar to FIG. 6, but showing the roof bubble collapsed;

FIG. 8 is an enlarged front sectional view of the car bubble taken along the line 8—8 of FIG. 1;

FIG. 9 is a view similar to FIG. 8, but showing the roof bubble collapsed;

FIG. 10 is a view taken along the line 10—10 of FIG. 7;

FIG. 11 is an enlarged sectional view of the left rear car door and taken along the line 11—11 of FIG. 1.

Although the invention is shown and described herein with reference to four-door passenger cars, it will be understood that it may apply to any type of standard conventional passenger car (two-door, four-door, coupe, etc.) having at least a front or driver's seat compartment.

Referring to the drawings, there is shown a passenger car mobile home unit of the invention and including, as main components, the modified self-propelled passenger car or automobile, generally designated as A, and containing a cabin or housing, generally designated as H, said housing being secured to the car to form a unitary structure therewith.

The automobile A, in the preferred form, is a conventional four-door, six passenger car having a standard type body including the usual front or driver's compartment C. The compartment C includes front left and right doors 10 and 11, front roof 12, front floor 13, windshield 14, front or driver's seat 15, and contains the steering wheel 16. The car also includes the usual hood 20, front bumper 21, front wheels 22, front fenders 23, rear left and right wheels 24 and 25, rear doors 26, rear left and right fenders 28 and 29, rear floor 30, rear bumper 31, differential 32, driveshaft 33 and drive shaft housing 34.

It is to be noted that the car does not have rear roof, trunk, rear seat, etc. In practice, a standard four-door passenger car is selected and modified by removing therefrom the rear seat, the rear windows and window posts, and the rear portion of the car roof starting at a point 36 immediately to the rear of the front door posts 37 and extending rearwardly to and including the trunk lid, thereby providing a recess 38 into which is positioned the housing H, later to be described. Thus, the recess 38 is defined as the space bounded at the bottom by the rear floor 30, at the front by the driver's seat 15, and at the sides by the spaced rear fenders 28 and 29 and the spaced rear doors 26 (the windows of said rear doors being removed).

The cabin H is a generally box-like structure and incudes a floor or aisle 42, left side wall 43, right side wall 44, rear or back wall 45, and a roof 46. The front section 42a of the aisle is on a higher level than the rear section 42b, said sections being divided by the step 42c, which passes over the differential 32. In transverse section, the floor 42 is flanked on each side by oppositely disposed left and right raised levels or sections 47 and 48, which are supported on the rear left and right fenders 28 and 29 respectively, the floor section 42b resting on the car trunk floor. Suitable windows 49 and 50 may be provided in the side walls 43 and 44 respectively. The roof 46 and the upper portion of the side walls 43 and 44 extend forwardly on the car to form, with the shelf 51 and the front wall 52, a hollow forwardly extending cabin front portion or extension 53 which overlies and is positioned on the car roof 12. The cabin front extension 53 has a pair of windows 54 and 55 on the front wall 52 thereof. Below the rear edge of the shelf 51, the front of the cabin H is open, thereby providing a common interior with the car. With this construction, access between the car and the cabin is effected. A rear door 56, having a louvered window 57, is disposed in the cabin back wall 45 to provide rear access to the cabin. A retractable foot step 58, hingedly secured to the rear bumper 31 for rotation in a vertical plane about a transverse axis, is disposed below the cabin door 56 to facilitate access therethrough.

The floor and walls of the cabin are configured to fit snugly into the recess 38. In line with this, pre-shaped fitting, baffles, or panels 59, 60 and 61 are provided between the housing forward extension 53 and the car roof 12 to provide a snug fit therebetween. The panels 59, 60 and 61 form an adapter kit that may be included with the cabin H—it being within the contemplation of the invention to optionally furnish such adapter kits with each cabin. More specifically, the adapter kits contain preconfigured parts, fittings and panels such as, for example, the fittings 59, 60 and 61, so that the cabin may be adapted to effect a secure, weather-tight fit with any standard, conventional make of car body. All joints between the cabin and the car may be sealed with any suitable conventional sealant means.

The cabin H may be secured to the car by any suitable fastening means such as rivets, screws, welding, etc., or by releasable fastening means such as bolts, releasable clamps, etc.

Interiorly, the cabin H contains all the usual sleeping and living accommodations and accessories such as the bed or bunk seats 62 and 63, a kitchen cabinet K including the stove or range 64 and the kitchen sink 65. A portable refrigerator (not shown) may be placed on the cabinet adjacent the sink. The closet 66 may contain a toilet 67. Access to such closet is effected through the closet door 68. The shelf 51 may contain a mattress 72 for sleeping purposes for one or two people. Similarly, the bunk seat 63 contains a mattress 73. A door 76 is provided below the bunk seat 63 to permit access to the storage space thereunder. Access to this space is also provided through the right rear car door. This structure may also be duplicated on the left side of the car whereby access to the space underneath the bunk seat 62 can be provided through the left rear car door—such being one of the features of the invention. The cabin floor 42 is in the form of an aisle disposed between the bunk seats 62 and 63 and between the closet 66 and the kitchen cabinet K, and extends rearwardly to the back door 56. The aisle is more than wide enough to accommodate a portable table 79 (shown in folded position against the back of the driver's seat 15) for eating purposes.

To provide adequate standing room in the cabin C, an upwardly extensible ceiling in the form of the canopy or roof bubble B is provided. The canopy B includes a rectangular frame F consisting of left and right side rail members 83 and 84 jointed to front and rear end rail members 85 and 86. The frame F is positioned in a rectangular aperture 87 in the cabin roof 46. The flexible roof 90 of the canopy B is rectangular in shape and is formed of a flexible, weather-proof material. In the present instance, the roof 90 is formed of thin, flexible sheet metal that can be easily flexed or placed into raised position (FIG. 6) or into a lowered or closed position (FIG. 7). The bottom or interior surface of the sheet metal may be covered with any suitable cloth or cloth-like material such as synthetic plastic cloth. Ribs or braces 91 are transversely secured to the top of the roof 90 to give the same transverse rigidity, yet permit longitudinal flexibility. The rear edge of the roof 90 is rotatively secured to the rear end rail 86 by the hinge 92 whereby the roof may rotate in a vertical plane and about a transverse axis.

The canopy B also includes the left and right semicircular side panels 96 and 97 hinged at 98 and 99, respectively, to the side rails 83 and 84 for rotation about longitudinal axes. The panels may be provided with louver windows 102 and 103 respectively.

In operation, the canopy is raised by swinging the side panels 96 and 97 upwardly, such action pushing the canopy roof 90 upwardly to a raised or arched position (FIG. 6), the side panels retaining the roof 90 in such position. The rod 106 may then be detachably positioned transversely between the panels with a tight fit to assist in retaining the panels apart and, in turn, in retaining the roof 90 in raised position. With the roof 90 thus disposed in raised position, the forward edge 90a of the roof is positioned adjacent the front rail member 85 and is retained in such position by the locking spring 108 which is secured at its ends to opposite corners of the edge 90a, such spring being placed under tension around the studs 110 and 111 in the front end rail 85 to retain the edge 90a in weather-sealing engagement with the cabin roof 46.

All edges of the roof 90 may be lined with a weather sealing means, such as foam rubber, to provide a weather-tight seal with the cabin roof 46 when the canopy B is in lowered position.

To lower the canopy, the rod 106 is removed from its position between the side panels 96 and 97, the spring 108 is released from the studs 110 and 111, the side panels 96 and 97 are rotated downwardly and inwardly, and the canopy roof 90 is drawn downwardly (rotating about the hinge 92), whereby the canopy roof front edge 90a is inserted under the elongated lip 112 on the cabin roof 46. To retain the canopy in closed position, a pair of lock levers 114 and 115, each rotatively secured at their midpoints to the roof 90 and spaced slightly therefrom, are rotated, in a horizontal plane, so that their end portions engage and underlie the adjacent edge portions of the panels 96 and 97, respectively, as shown in FIG. 10. A further locking means may be provided by placing the rod 106 underneath the spring retaining lugs 118 and 119, which are secured to the inner sides of the respective side panels. To hold the front end of the roof 90 in closed position, a second locking spring 122 may be provided, such spring being secured at its ends to opposite edges of the forward portion of the roof 90, the spring being pulled and placed under tension around the studs 110 and 111 in the front end rail 85.

Any suitable spring retaining means may be used in place of the springs 108 or 122, it being understood that such springs are given only as examples of such means.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

I claim:
1. A standard conventional passage car having an enclosed front seat driving compartment, said car having an opened topped rear portion forming a recess behind said compartment and having a rear floor, spaced rear side doors flanking the forward portion of said rear floor and extending upwardly therefrom spaced rear fenders flanking the rearward portion of said floor and extending upwardly therefrom, and a car cabin disposed on the floor of the recess and between said doors and having a forwardly extending portion overlying the front compartment and supported thereon said cabin configured to be further supported on said floor, and on said fenders, said cabin configured to provide storage space exteriorly thereof and interiorly of the doors, said doors providing access to said storage space.

2. In combination; a standard conventional passenger car including an enclosed front seat driving compartment and having an open topped rear portion forming a recess, said car also including spaced rear side doors and spaced rear fenders flanking said recess; and a mobile car cabin disposed in said recess, said cabin having a floor including a central longitudinal aisle flanked by raised floor sections on each side of the aisle forming storage spaces on each side of the aisle exteriorly of the cabin and below said raised floor sections and interiorly of the rear doors, whereby access to the storage spaces is effected through said rear doors.

3. A vehicle comprising: a sedan automobile having automobile seats limited to front seats only; two front side doors adjacent the front seats; side window openings only associated with said two side doors; an open top from at least a location adjacent the rear of the front seats back a distance as far as the rear portion of a trunk cavity; side body portions extending from the said two front side doors back to the rear end of the vehicle that extend upward essentially no higher than the bottom of the said side window openings; rear fenders forming a part of said side portions; and a mobile car cabin disposed in said sedan behind the front seats and extending upward through the said open top above the said side portions, said mobile car cabin including a lower portion received between the said side body portions of the sedan and an upper portion that extends over the said side body portions of the sedan, said lower portion of the car cabin being formed by spaced side walls at least one of which is spaced inwardly from the side body portions of the sedan to provide a compartment between the side wall of the car cabin and the adjacent side body portion of the sedan, directly accessible from outside the vehicle through a side door or said sedan automobile.

4. The vehicle of claim 3 wherein the mobile car cabin is in part supported directly by the rear fenders.

5. The vehicle of claim 4 wherein the mobile car cabin extends no farther backward from the front seat than the rear end of the sedan.

6. The vehicle of claim 3 wherein the sedan has a roof over the front seat and the mobile car cabin extends over the roof of the sedan.

7. The vehicle of claim 3 wherein the sedan has two additional side doors, one just behind each of the said two front side doors, at least one of said additional side doors opening directly to the said compartment from outside the vehicle.

8. A vehicle comprising: a passenger compartment; a rear compartment behind the passenger compartment having a floor, side body portions and an open top, said side body portions including spaced rear fenders flanking a rearward portion of said floor and extending upwardly therefrom; a mobile car cabin in part located in the rear compartment, said mobile car cabin configured to be supported on said floor and on said fenders and having a lower portion with said walls within the rear compartment and spaced inwardly from the side body portions to form a storage compartment exteriorly of the car cabin; side doors in the vehicle, at least one of said side doors opening through the body portions of the vehicle into the storage compartment.

References Cited

UNITED STATES PATENTS

| | | | |
|---|---|---|---|
| D. 192,795 | 5/1962 | Sloat | 296—23 |
| D. 189,395 | 12/1960 | Fogelsonger | 296—23 |
| 789,961 | 5/1905 | Call. | |
| 2,531,678 | 11/1950 | Gledhill | 135—1 |
| 2,718,015 | 9/1955 | Fisk | 296—23 |
| 2,926,042 | 3/1957 | Calthorpe | 296—23 X |
| 3,003,808 | 10/1961 | Swanberg | 296—24 |
| 3,019,046 | 1/1962 | Laster | 296—10 |
| 3,160,435 | 12/1964 | Smith | 296—23 |
| 3,185,518 | 5/1965 | Zentner | 296—23 |
| 3,186,754 | 6/1965 | Winstead | 296—23 |
| 3,190,689 | 6/1965 | Calthorpe | 296—23 |

BENJAMIN HERSH, *Primary Examiner.*

P. GOODMAN, *Assistant Examiner.*

UNITED STATES PATENT OFFICE
CERTIFICATE OF CORRECTION

Patent No. 3,347,589                                October 17, 1967

Harold W. Sirk

It is hereby certified that error appears in the above numbered patent requiring correction and that the said Letters Patent should read as corrected below.

Column 5, line 37, for "passage" read -- passenger --; column 6, line 19, for "or" read -- of --; column 6, after line 46, insert claim 9:

9. In combination; a standard conventional passenger car including an enclosed front seat driving compartment and having a cut-out rear portion forming a recess; and a mobile car cabin disposed in said recess, said cabin comprising front, rear and side walls and a roof providing a human occupancy structure, said roof having an aperature, an upwardly extensible canopy disposed in said aperture, said canopy comprising a rectangular frame disposed in the aperature and having front, rear and left and right side rail members, a longitudinally flexible canopy roof covering the aperature and hingedly secured at one of its edges to the frame rear rail member for swinging movement in a vertical plane about a transverse axis to raised and lowered positions, a pair of spaced side panels underlying said canopy roof and hingedly secured to the left and right side rail members respectively for swinging movement in a vertical plane about longitudinal axes to raised and lowered positions, said panels being configured to place the flexible canopy roof in a raised arched position over the aperature when the panels are swung upwardly to raised position, and spring retaining means on the canopy roof for retaining the canopy roof in weather-sealing engagement with the cabin roof when the canopy is in raised position, said spring retaining means comprising an elongated spring secured at its ends to the respective side edges of the canopy roof adjacent the canopy roof front edge, and a pair of studs secured in horizontal spaced relation in the frame front rail member and extending rearwardly therefrom, whereby the spring may be pulled and placed under tension around said studs to retain the canopy roof in weather-sealing engagement with the cabin roof.

in the heading to the printed specification, line 6, for "8 Claims" read -- 9 Claims --.

Signed and sealed this 26th day of November 1968.

(SEAL)
Attest:

EDWARD M. FLETCHER, JR.
Attesting Officer

EDWARD J. BRENNER
                                           Commissioner of Patents